US012762330B2

(12) United States Patent
Simon

(10) Patent No.: US 12,762,330 B2
(45) Date of Patent: Oct. 13, 2026

(54) HIDDEN ROW INSERTER FOR USER INTERFACE INPUT

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 18/411,291

(22) Filed: Jan. 12, 2024

(65) Prior Publication Data

US 2025/0232109 A1 Jul. 17, 2025

(51) Int. Cl.

*G06F 3/048* (2013.01)
*G06F 3/0481* (2022.01)
*G06F 3/04842* (2022.01)
*G06F 40/177* (2020.01)

(52) U.S. Cl.

CPC .......... *G06F 40/177* (2020.01); *G06F 3/0481* (2013.01); *G06F 3/04842* (2013.01)

(58) Field of Classification Search

CPC ... G06F 40/177; G06F 3/0481; G06F 3/04842
See application file for complete search history.

(56) References Cited

U.S. PATENT DOCUMENTS 6,151,624 A * 11/2000 Teare ...................... H04L 67/51 707/999.005
6,865,713 B1 * 3/2005 Bates .................. G06F 16/9577 715/233
2015/0100606 A1 * 4/2015 Bonner ............... G06F 16/2282 707/803
2016/0292206 A1 * 10/2016 Ruiz Velazquez ........................... G06F 3/04842

OTHER PUBLICATIONS

Communication: "Extended European Search Report", Jun. 10, 2025 (Jun. 10, 2025), European Patent Office, for European Application No. 2515075.8-1207, 9 pages.
Hong, YoonSung et al., "ODK Tables: Data Organization and Information Services on a Smartphone", Jun. 28, 2011 (Jun. 28, 2011), (pp. 33-38, 9 total pages), XP058004552, DOI: 10.1145/1999927.1999937, ISBN: 978-1-4503-0739-0.

* cited by examiner

*Primary Examiner* — Haoshian Shih
(74) *Attorney, Agent, or Firm* — Buckley, Maschoff & Talwalkar LLC

(57) ABSTRACT

Provided are systems and methods that are directed to a pop-up insertion window for simplifying a user interaction when inputting data into a table. In one example, the method may include storing tables of data in memory, displaying a plurality of rows of data from a table among the tables of data stored within the memory via a user interface of a software application, receiving a request to add a row to the table, displaying a pop-up window via the user interface, the pop-up window comprising a plurality of fields for inputting data and an input button, receiving input content via the plurality of fields within the pop-up window, and inserting a new row with the received input content into the plurality of rows of data displayed via the user interface, in response to a command via the user interface.

17 Claims, 21 Drawing Sheets

200A

200C

200D

300B

300C

300D

300E

300F

300H

300I

300K

400A

400B

400C

500

HIDDEN ROW INSERTER FOR USER INTERFACE INPUT

BACKGROUND

A table, such as a database table, is a collection of related data that is held in tabular form. For example, the table may include columns and rows that overlap with one another to create an array of cells. Each row usually corresponds to a unique record and each column corresponds to a different field in that record. A software application may be used to fill-in data within the table based on data entered by a user. To enable data entry, the software application may output a user interface with input fields for inputting data via an input mechanism (e.g., keyboard, mouse, touch, voice, etc.) which is to be stored within the table.

For more complex data applications, the input fields are often spread across multiple different pages of the software application. As a result, the user often needs to navigate to multiple different pages in order to input the necessary data. The added time and inefficiency that is caused by having to navigate to the different pages is compounded when a user has to repeat the data entry process throughout the day.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

Figure 1:
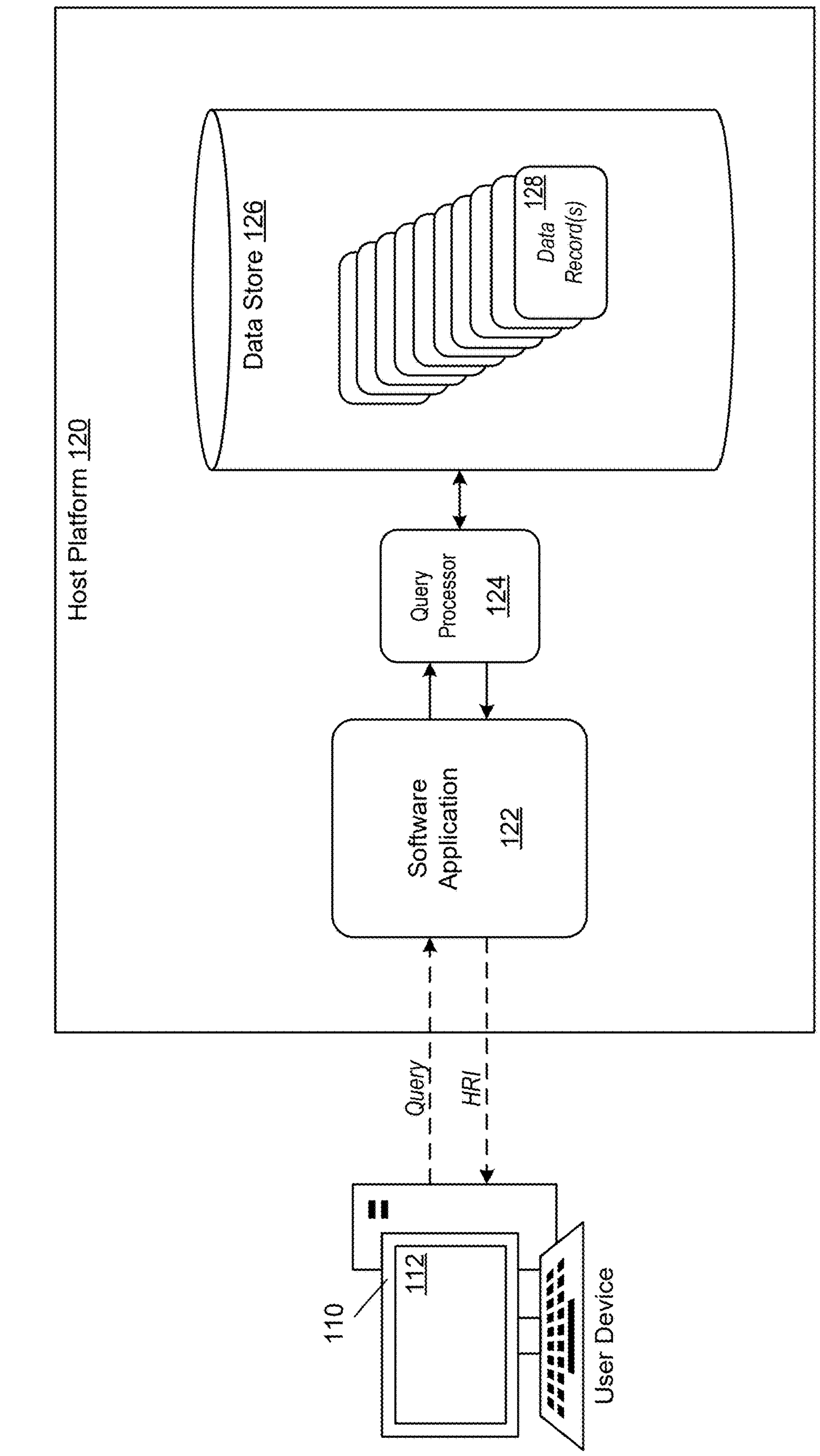
FIG. 1 is a diagram illustrating an example of a computing environment for inserting data into a table in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Tables are database objects that store data in a predefined format which typically includes a plurality of rows arranged vertically and a plurality of columns arranged horizontally. The combination of rows and columns essentially creates a two-dimensional array of data values. When viewed as a whole, a database table can appear like a large block of numbers or other values which can be difficult to understand to a viewer. It can be even more difficult to view the table data when the user is on a device with a smaller viewing display screen such as a mobile phone, tablet, smart wearable device, or the like.

Software applications that enable viewers to visualize and enter data (e.g., into a database table, etc.) may often provide a series of workflows for entering data including multiple windows and/or display screens with different input fields for data entry. One of the difficulties of entering data into a table is when the data cannot be viewed on a single page. For example, when a user requests to add a new row to the table, but the display screen is full, the new row is often displayed on a different page. To access the different row, the user needs to navigate the display screen to the different page. This process may add a few seconds to the time needed by the user to input the data each time a new record is added to the table. When this process is repeated multiple time a day, such as for entering many data records, the additional time required to navigate to the different pages can result in significant delay and lost efficiency.

The example embodiments overcome the drawbacks noted above through a pop-up window that remains on the same page and enables the user to enter data into different pages of the user interface. The pop-up window is referred to herein as the “hidden row inserter”. The hidden row inserter may include a solid background. The software may overlay the hidden row inserter on top of the rows of data that are currently displayed on the user interface. In doing so, the user interface may partially conceal the underlying content enabling a clear view of the hidden row inserter. Multiple input fields and labels of the data to be entered into the multiple input fields may be displayed within the hidden row inserter. The labels identify the data that is to be input into the fields. The hidden row inserter may also include buttons or other user interface elements which enable a user to enter commands via the hidden row inserter such as to add a new row to the table, to close the hidden row inserter, and the like.

The hidden row inserter may provide a separate input area with respect to the user interface and may include one empty row which is a copy of an empty row from the original table. That is, the hidden row inserter (HRI) may be a table with one single row. The hidden row inserter may initially be hidden from view (e.g., not active) on the page. The hidden row inserter may be activated by different conditions. For example, the hidden row inserter may be activated by a user pressing a button or other control element within the user interface. As another example, the hidden row inserter may be activated automatically by the software in response to a condition such as the user interface being full and not having any more room for new rows of data. In this case, the software may detect that the user interface is full and automatically initiate a display of the hidden row inserter.

When the software initiates the display of the hidden row inserter, the software may render the hidden row inserter at a predetermined height within the user interface. The height may be fixed such that the hidden row inserter is always opened at this position regardless of whether there is content above the original table or not. For example, the position may be a particular row or pixel height. Therefore, it doesn't matter how much content is displayed above the table, the hidden row inserter may always be opened at this position. It should also be appreciated that the height at which the hidden row inserter is displayed may be adjusted by a user based on commands entered via the user interface and/or the hidden row inserter.

FIG. 1 illustrates an example of a computing environment 100 for inserting data into a data record in accordance with an example embodiment. Referring to FIG. 1, a user may access a software application 122 that is hosted by a host platform 120 such as a web server, a cloud platform, a database, a combination of systems, an on-premises server, and the like. The user may access the software application 122 by connecting to the host platform 120 over a network using a user device 110. For example, the user may type in a web address of the software application 122 into a web browser (not shown) that is displayed on a user interface 112 of the user device 110. As another example, the software application 122 may include a mobile application that can be accessed from a mobile device that installs a front-end of the software application, a mobile browser, and the like.

In this example, the user is entering data into data records 128 that are stored within a storage device such as a data store 126. The data store 126 may be a database, a cloud storage, a local storage, an in-memory storage, and the like. The data records 128 may be tables of data such as database tables, files such as XML files, JSON files, etc., documents such as word-based documents, digital documents, and the like.

During operation, the user may enter a command via the user interface 112 which identifies a particular record, search criteria to search for a record, or the like. In response, the command may be received by the software application 122 and used to build a query for querying the data store 126 for the requested record. In this example, the software application 122 may transfer the request to a query processor 124 which builds a query such as a structured query language (SQL) query, OQL query, XQuery, or the like, and submit the query to the data store 126. In response, the data store 126 may identify a correspond record, and return it to the software application 122 via the query processor 124. The software application 122 may display content stored in the record in tabular form via the user interface 112.

As an example, content from the data record may be displayed as a table on the user interface 112 containing one or more columns of data overlapped by one or more rows of data which are visually depicted on the user interface 112 in a comprehensible manner to a viewer. In this case, the user can activate a hidden row inserter from the user interface 112 as further described in the examples of FIGS. 3A-3J and 4A-4C. The hidden row inserter can save the user time when performing data entry from the user interface 112 to data records 128 stored in the data store 126.

With the record displayed on the user interface 112 of the user device 110, the user can enter commands into the user interface 112 to modify the record by creating new data, reading existing data, updating existing data, deleting data, and the like. In this example, the software application 122 may execute program code to provide the query processor 124 with an identifier of a data record to be searched for, a keyword or term, a file name, etc. In response, the query processor 124 may identify one or more records and return them to the software application 122 where they can be accessed by the user via the user interface 112 displayed on the user device 110. The host platform 120 may provide services for executing applications. For example, the software application 122 may communicate with the query processor 124, the user device 110, and other systems and services using Hypertext Transfer Protocol (HTTP) requests.

Figure 2A:
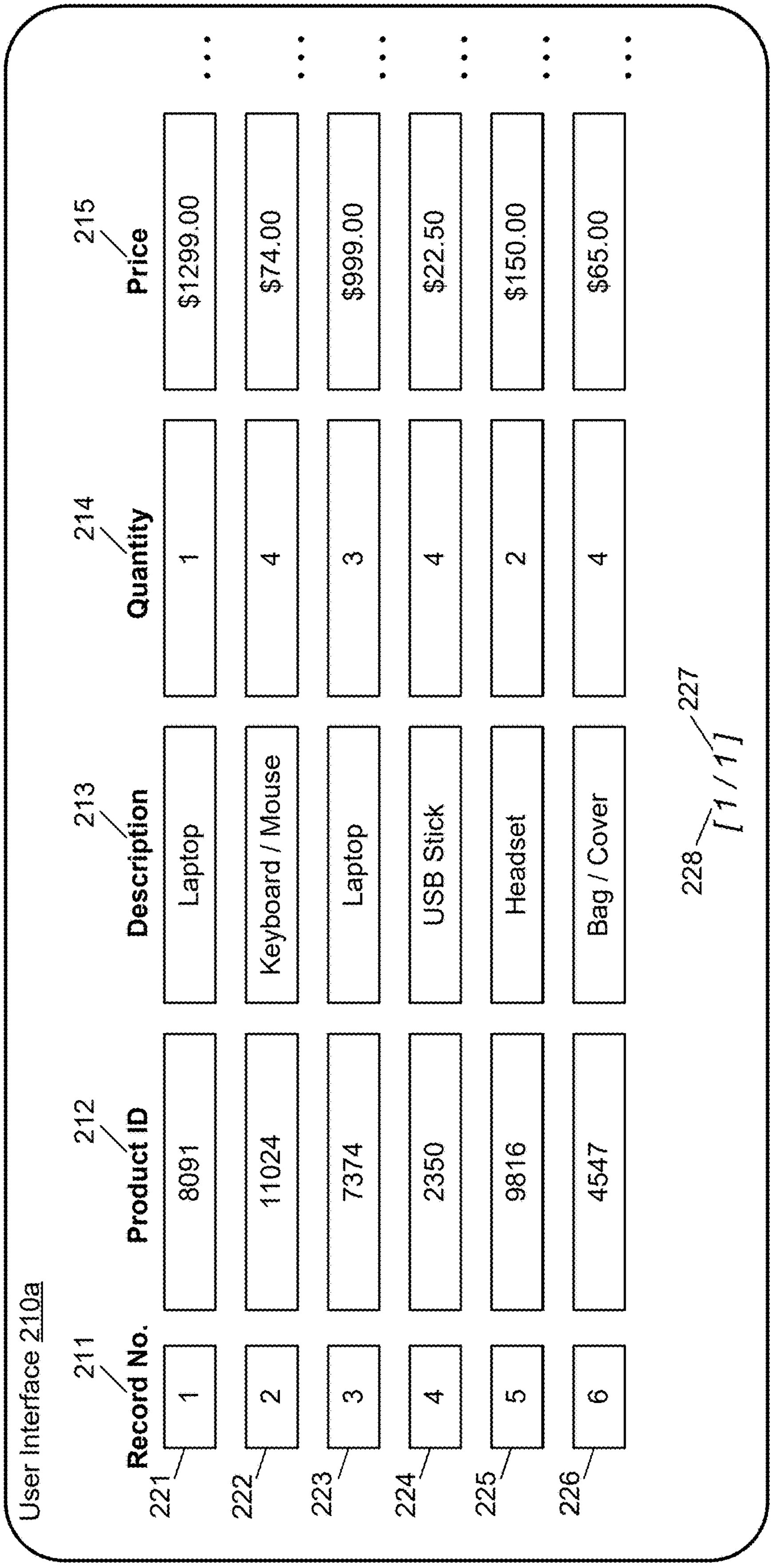
FIGS. 2A-2D are diagrams illustrating a process of a software application inserting new rows into a table based on user interaction with an add button in accordance with example embodiments.

FIGS. 2A-2D illustrate a process of a software application inserting new rows into a table based on user interaction with an add button in accordance with example embodiments. For example, FIG. 2A illustrates a view 200A of a user interface 210*a* with a plurality of columns 211, 212, 213, 214, and 215 of data, and a plurality of rows 221, 222, 223, 224, 225, and 226, overlapping the plurality of columns 211, 212, 213, 214, and 215 within the user interface 210*a*. In this example, there are six rows of data shown. The data displayed within the user interface 210*a* may be extracted from a data record, such as a database table, that is stored within an underlying data store.

The user interface 210*a* also includes a page count 227 that identifies the total number of pages of data rows on the user interface, and also a current page identifier 228 that identifies which page from among the total number of pages is currently being displayed by the user interface 210*a*. In this example, there is only one page of data. Therefore, the page count 227 and the current page identifier 228 are the same (i.e., 1).

According to various embodiments, the user interface 210*a* may have a limited amount of viewing space that can be displayed on the screen at the same time. The limitations may be the result of limitations on device screen size, limitations on server output, limitations on network bandwidth, and the like. In this example, the user interface 210*a* is limited to displaying eight rows of data at the same time. If a ninth row of data is added, the row will need to be added to a different page due to the limitations on the viewing space.

Figure 2B:
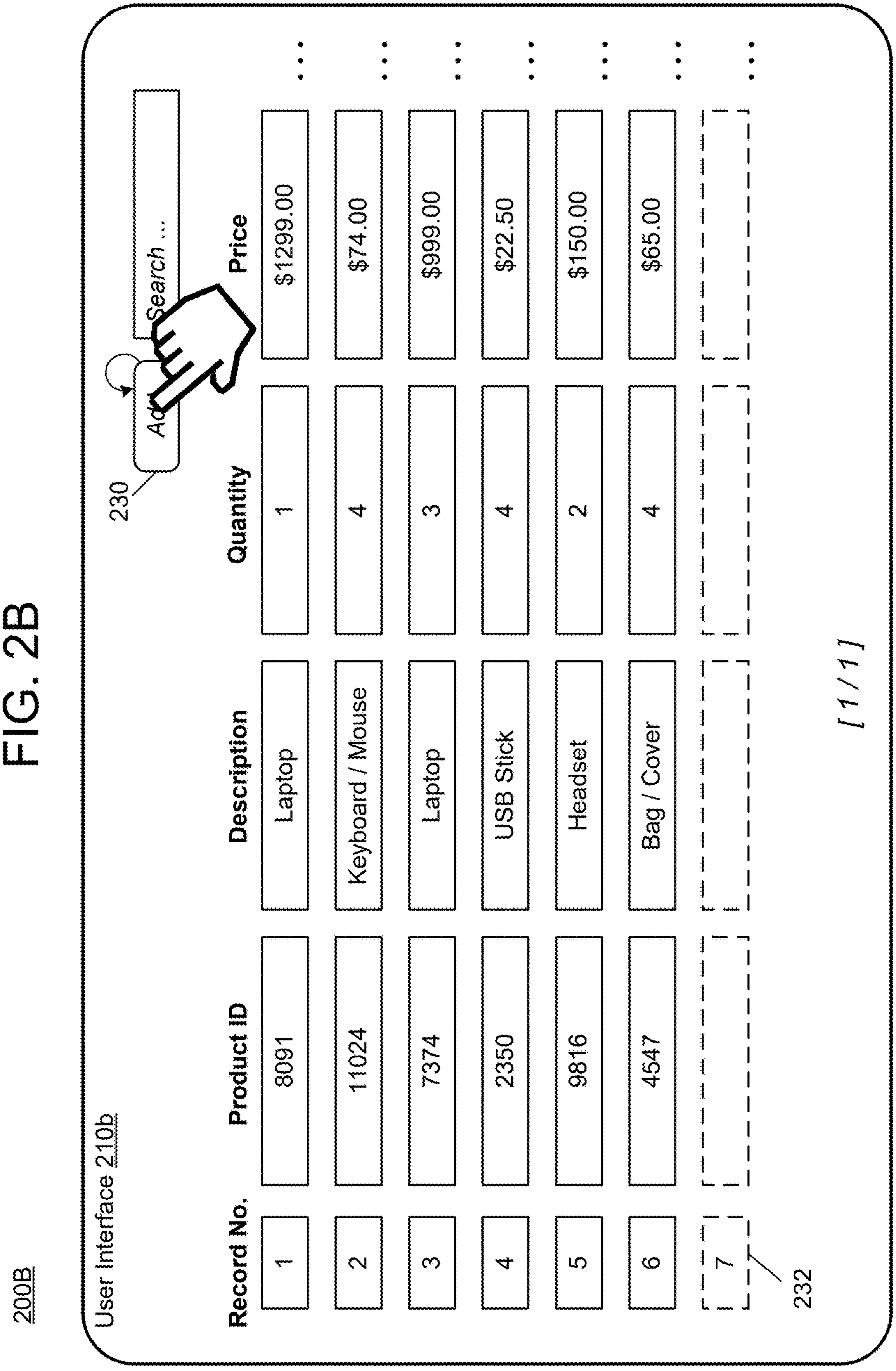

FIG. 2B illustrates a view 200B of a new row 232 being added to a user interface 210*b* using an add button 230 displayed within the user interface 210*b*. Here, the user may click on the add button 230 with a finger, mouse/cursor, keyboard command, or the like. In response, the software application may add an empty row (the new row 232) to the user interface 210*b* if there is enough space available. In this case, the software determines that only six rows of data are shown so another row will fit in the available space, which can accommodate eight rows. Here, the user can enter data into the empty row via the user interface 210*b*. This process is relatively easy because all the rows fit on the same page.

Figure 2C:
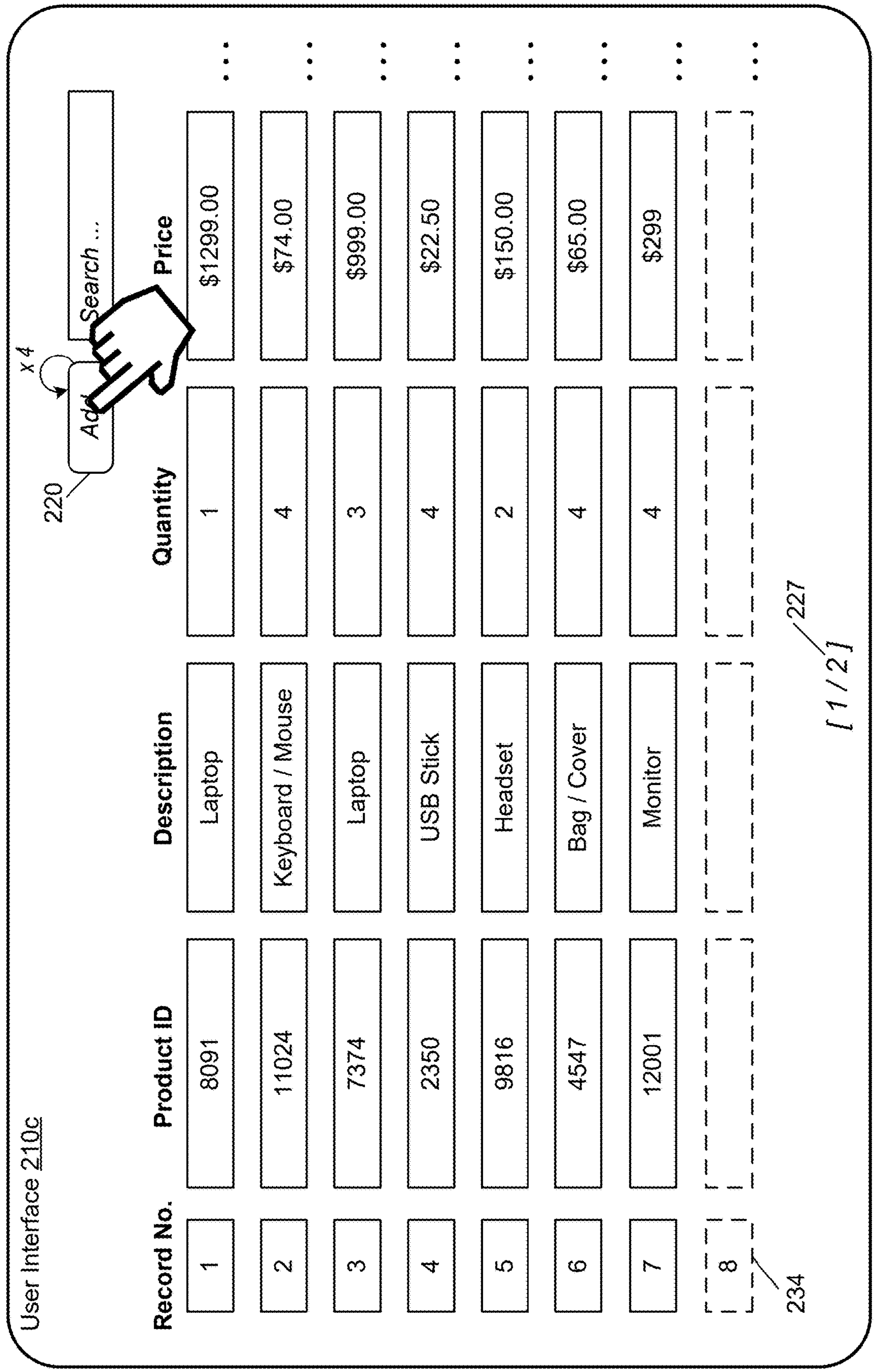
Figure 2D:
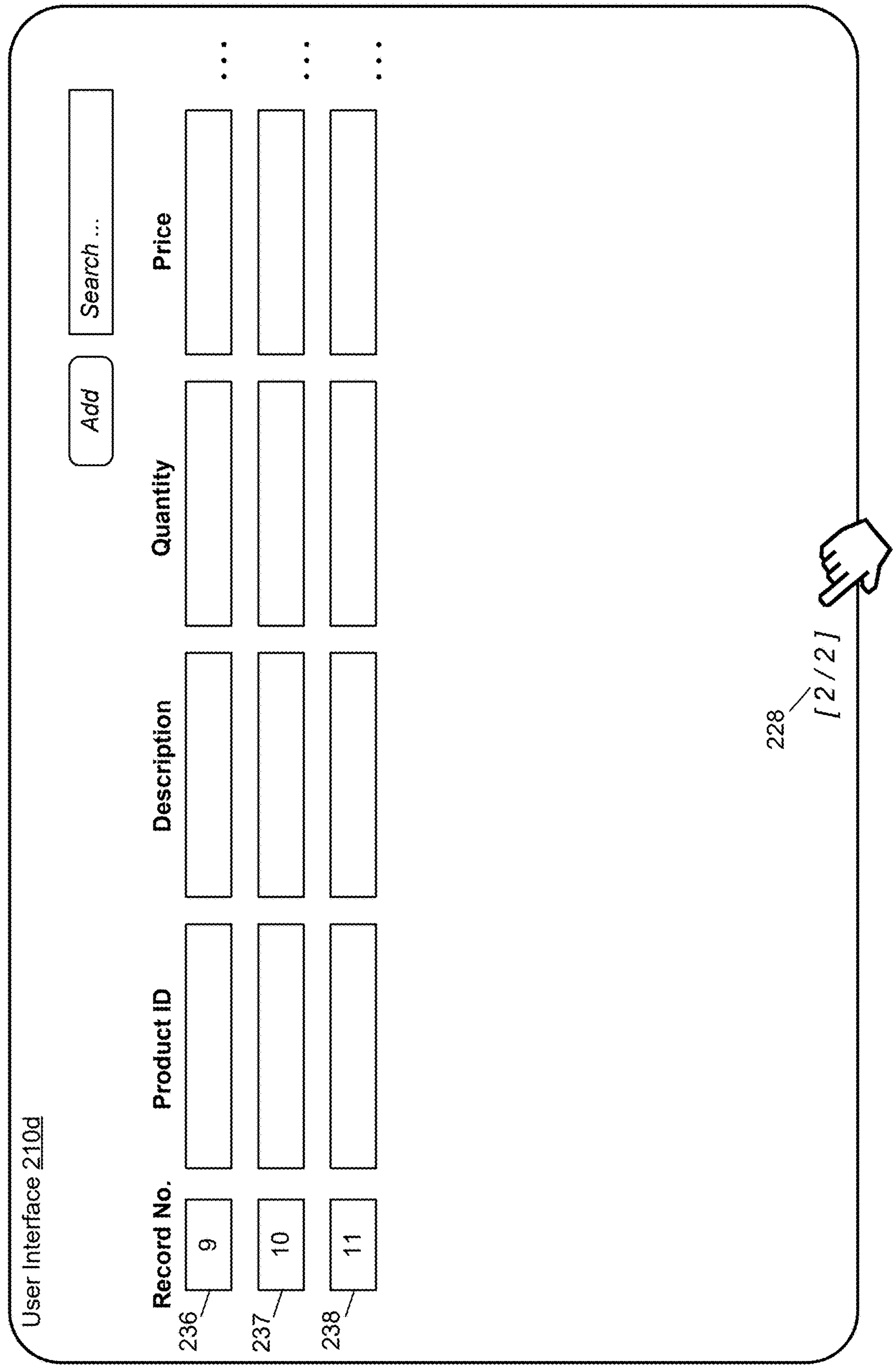

FIG. 2C illustrates a view 200C of a user interface 210*c* where a user has added four new rows to the table shown on the user interface 210*c* by clicking on the add button 220 four different times resulting in four new rows of data being added to the user interface 210*c*. In this example, a new row 234 is displayed on the user interface 210*c* where the add button 220 is located. However, because of the space limitations of the user interface 210*c*, the software must add three of the four new rows to a second page of the user interface 210*c*. Therefore, the software must open a new page and add the records thereto as shown in FIG. 2D. Furthermore, the software also changes the identifier of the total number of pages from one to two, because a second page has now been opened.

Referring now to FIG. 2D, a view 200D of a user interface 210*d* with a view of the second page of row content. Here, the second page includes the additional three rows (empty rows) that were added in the process of FIG. 2C. Furthermore, in this example, the current page identifier 228 has been changed by the software application because the user is now viewing the second page of the user interface. Here, the user must enter data into the new row 234 on the first page of the user interface as shown in FIG. 2C, and then navigate to the second page of the user interface and input additional data to fill in the new rows 236, 237, and 238.

FIGS. 3A-3K illustrate a process of inserting data into a table using a hidden row inserter in accordance with example embodiments. The hidden row inserter enables the user to continually view the first page (or any desired page) of the user interface, while adding new data rows to other pages that are not currently shown on the user interface. This enables the user to remain on the same page throughout the data entry process.

Figure 3A:
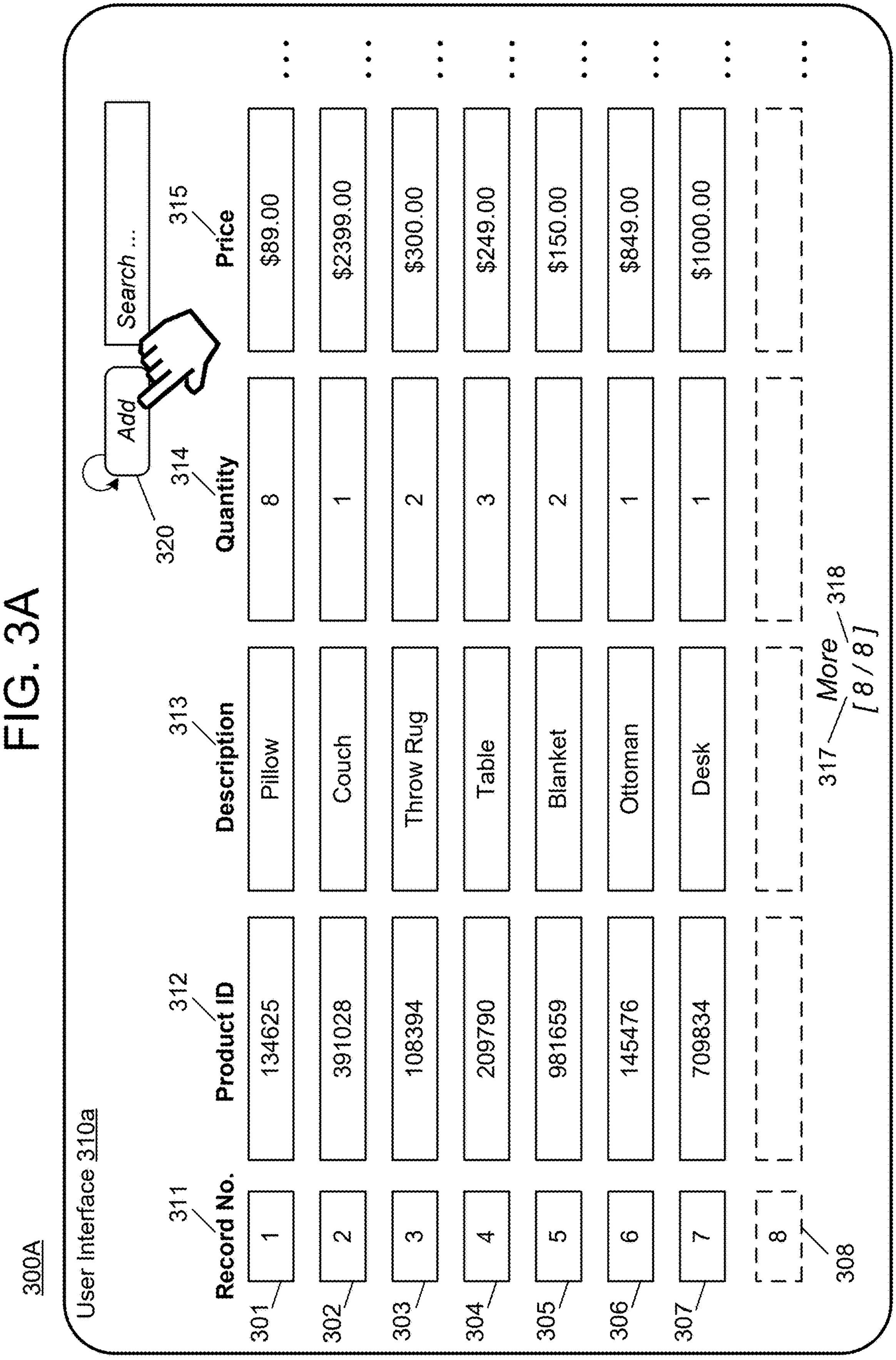
FIGS. 3A-3K are diagrams illustrating a process of inserting data into a table using a hidden row inserter in accordance with example embodiments.

For example, FIG. 3A illustrates a view 300A of a user interface 310*a* with a plurality of columns 311, 312, 313, 314, and 315 of data, and a plurality of rows 301, 302, 303, 304, 305, 306, and 307, overlapping the plurality of columns 311, 312, 313, 314, and 315 within the user interface 310*a*. In this example, there are seven rows of data shown. Similar to the example in FIGS. 2A-2D, the user interface 310*a* has a limited viewing area in which only eight rows of data can be displayed at the same time. Here, the user may press an add button 320 embedded within the user interface 310*a*, which causes the software to add a new row 308 to the user interface 310*a* for data entry. The new row 308 includes empty fields where data values can be input by a user with a pointer, keyboard, or the like.

In this example, the software may receive the request for the new row 308 in response to the user pressing the add button 320. In response, the software may determine whether there is available space of the new row within the current view/page of the user interface 310*a*. Here, there is enough space and the new row 308 is displayed within the user interface 310*a*. Furthermore, a user can enter values within the new row 308 and press a submit button causing the content within the new row 308 to be stored/recorded in an underlying data record (e.g., table, etc.) with the data store. The user interface 310*a* also includes an identifier 317 of a number of rows within the user interface, and an identifier 318 of a total number of rows across all pages of the user interface. The total number of rows across all pages of the user interface will differ from the number of rows within the user interface when a second page of rows has been opened.

Figure 3B:
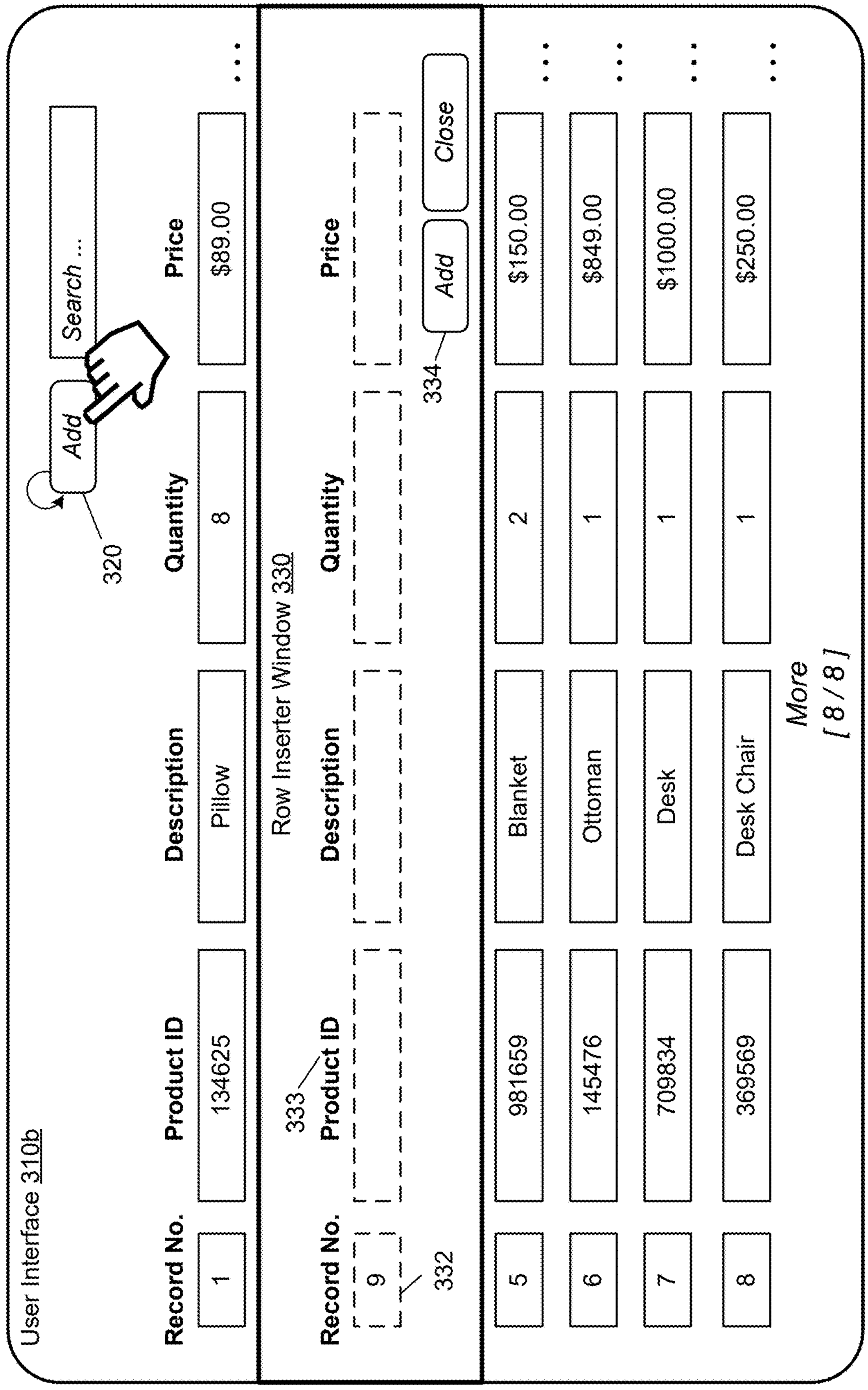

FIG. 3B illustrates a view 300B of a row inserter window 330 being displayed on a user interface 310*b*. The row inserter window 330 corresponds to the "hidden" row inserter described in the example embodiments. As the name suggests, the row inserter window may initially be hidden on the user interface and activated based on a condition. In this example, the eighth row has been added to the user interface 310*b* from the example in FIG. 3A, and the user has filled in the field. In this example, when the user presses the add button 320, the row inserter window 330 is displayed/activated in response. The software determines that the currently displayed page of the user interface 310*b* is full and cannot display another row at the same time. In response, the software opens the row inserter window which may be a pop-up window that is overlayed on content within the user interface 310*b*. The row inserter window 330 is overlayed over multiple rows of data being displayed within the user interface 310*b*.

In this example, the row inserter window 330 includes an empty row 332 with a plurality of empty fields for receiving input alphanumeric content, text content, numerical content, symbols, and the like. The row inserter window 330 may be limited to only a single row being visible at once, however, embodiments are not limited thereto. The row inserter window 330 also includes a plurality of labels 333 that identify what data values go into each of the fields in the row inserter window 330. The labels are a copy of/the same as the labels in the user interface 310*b*. Thus, the user can easily visualize which column of data each input field corresponds to.

The row inserter window 330 also includes an add button 334 that the user can press to add a new record to the underlying user interface. The row inserter window 330 may be displayed at a predetermined row height within the user interface. For example, the row inserter window 330 may be displayed under the first row within the user interface 310*c*. However, the height is not limited to a particular height.

Figure 3C:
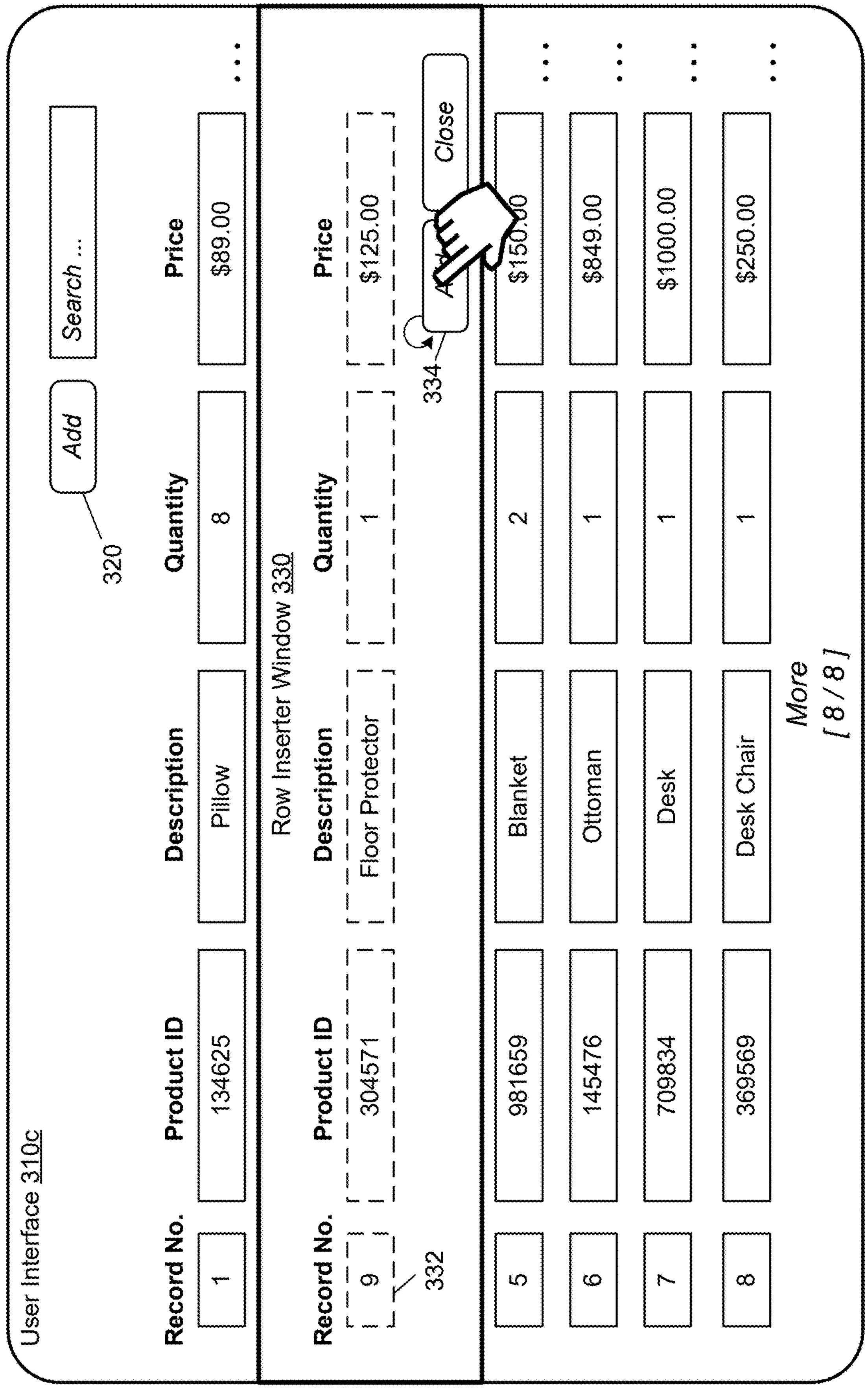

FIG. 3C illustrates a view 300C of a user interface 310*c* where a user has input data into the fields of the new row (i.e., the empty row 332 that has been filled in) within the row inserter window 330. When the user desires, the use can press the add button 334 within the row inserter window 330 which causes the software to add the new row within the user interface 310*c*. In this example, the software may determine that the current page displayed within the user interface 310*c* has no more room for a new row and may add the new row to a second page/additional page that is hidden on the user interface 310*c*. In response, the software may automatically add the new row to a hidden page (new page) that the software initiates in response to the command being input via the row inserter window 330.

Figure 3D:
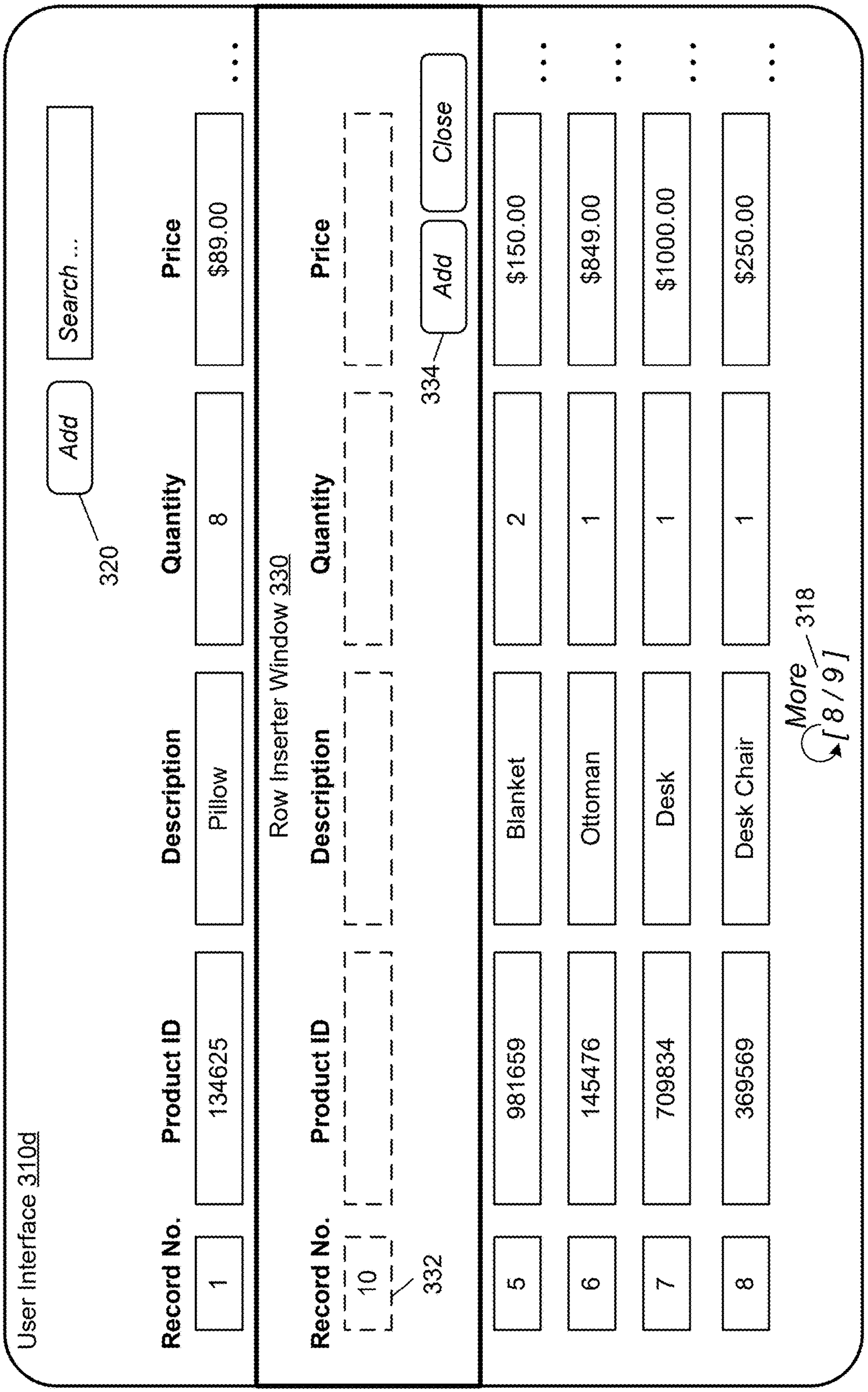
Figure 3E:
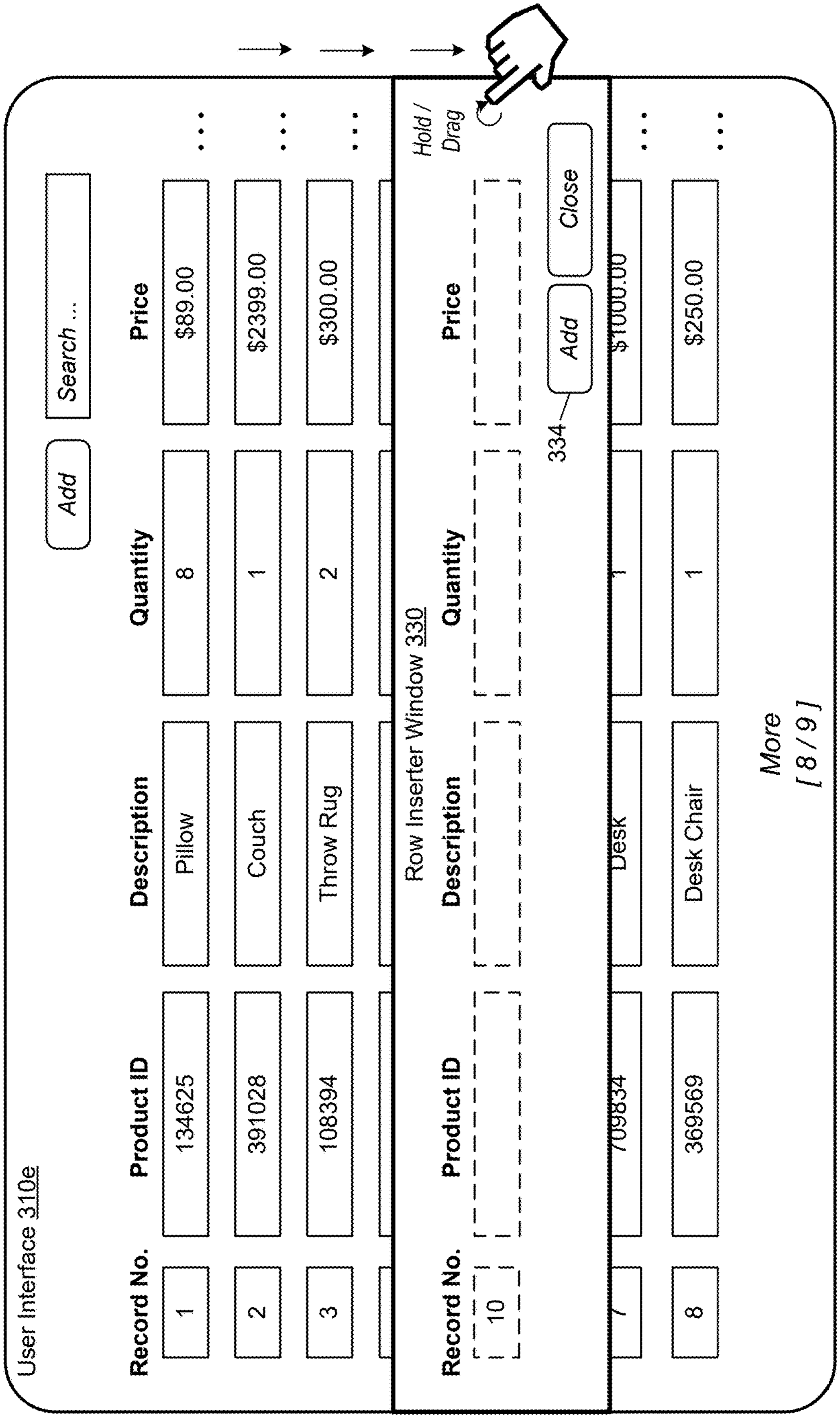

For example, FIG. 3D illustrates a view 300D of a user interface 310*d* after the user has pressed the add button 334 within the row inserter window 330 shown in FIG. 3C. Here, the software determines that the page is full and can not fit any new rows of data. Instead, the software adds the new row to a second page which is hidden and not shown in the user interface 310*d*. The software also updates the identifier 318 of the total number of rows across all pages to indicate that the additional row has been added. However, the identifier 317 remains the same because the new row was added to a different page than the one currently being displayed by the user interface 310*d*.

In some embodiments, the user may interact with the row inserter window 330. For example, a user may input commands on a user interface 310*e* as shown in a view 300E of FIG. 3E and cause the row inserter window 330 to change heights within the user interface 310*e*. Here, the user may perform a press and hold on the row inserter window 330 with a touch, cursor, etc., and drag the row inserter window 330 down to a desired height. The user may move the hidden row inserter up and/or down with the user interface 310*e* to change the viewing height of the row inserter window 330 within the user interface 310*e*. In some embodiments, the user may also move the row inserter window 330 in a lateral direction. However, in this example, the row inserter window 330 is the same width as the user interface 310*e*. This prevents the user from seeing underlying content that could potentially confuse the user.

Figure 3F:
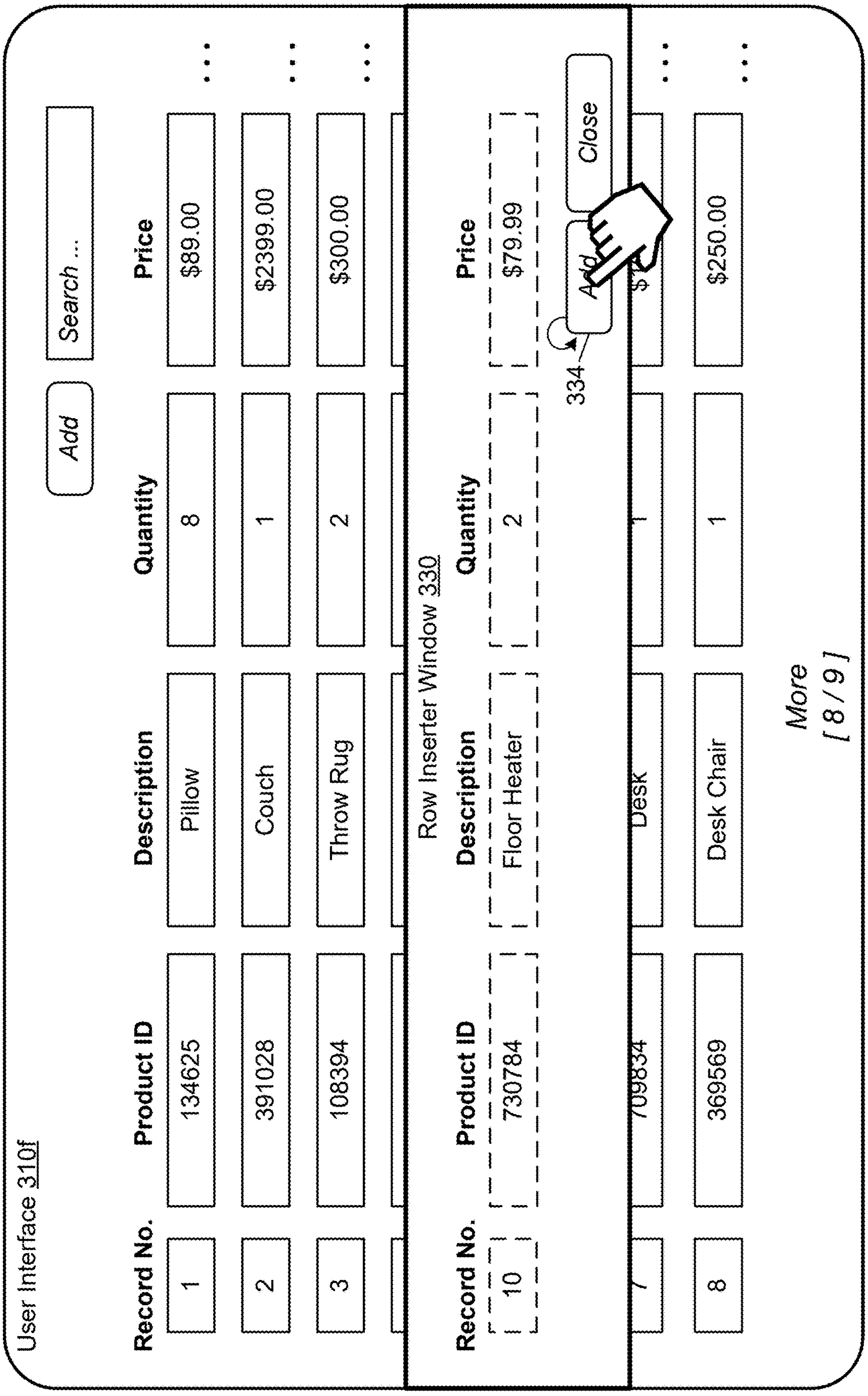
Figure 3G:
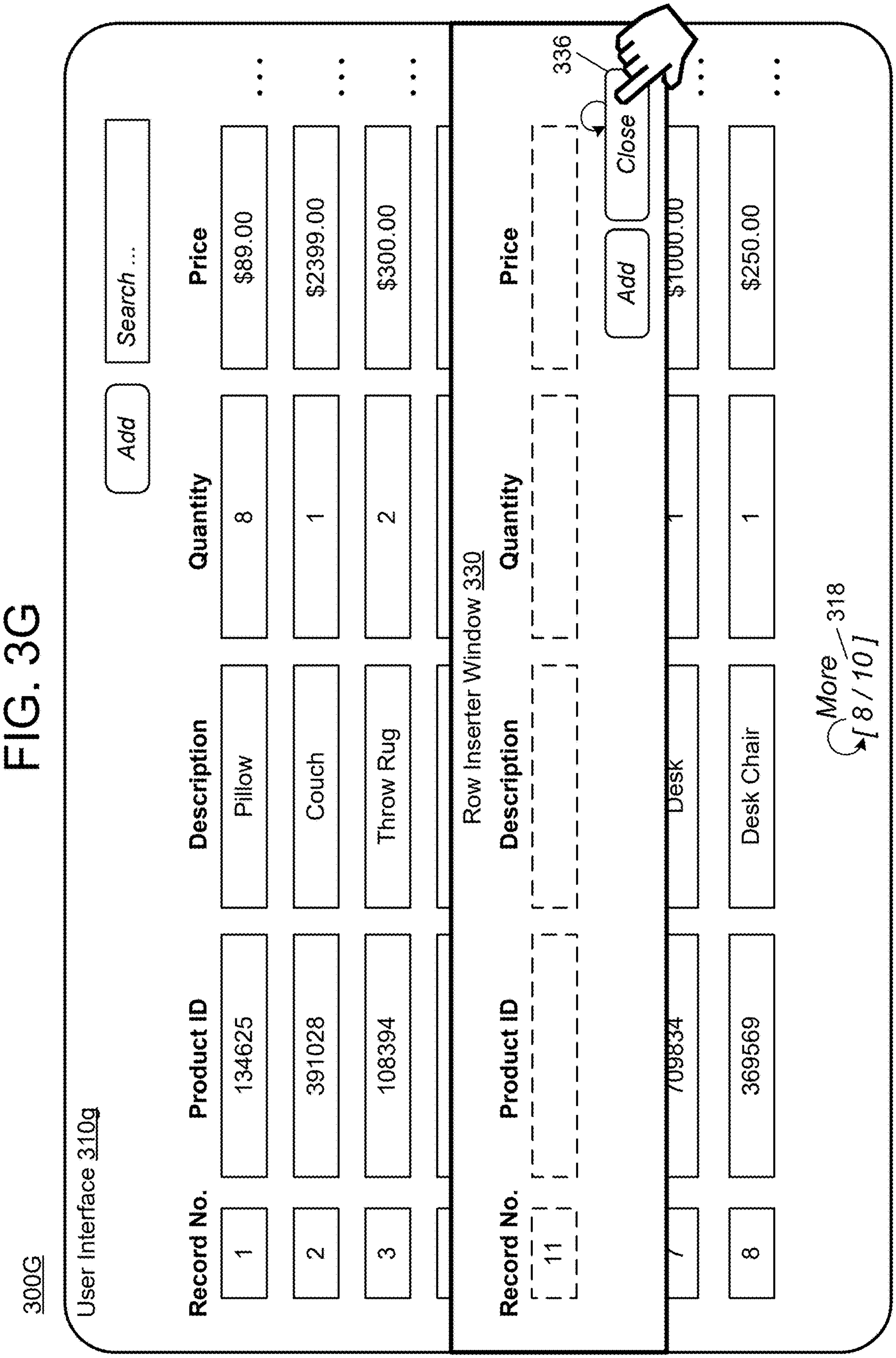

FIG. 3F illustrates a view 300F of a user entering data into the row inserter window 330 after it has been moved on the user interface. In this example, the row inserter window 330 is below the third row of data within a user interface 310*f*. Here, the user may input content into the fields of the row inserter window 330, and press the add button 334 triggering an additional new row of data being added to the second page of row data that is currently hidden from the user interface. In response, the software may update the identifier 318 of the total number of rows as shown in a view 300G of a user interface 310*g* in FIG. 3G. The user may continue to enter rows of data into the hidden page of the user interface until the user has decided to stop. Here, the user may press a close button 336 within the row inserter window 330 which causes the row inserter window 330 to close.

Figure 3H:
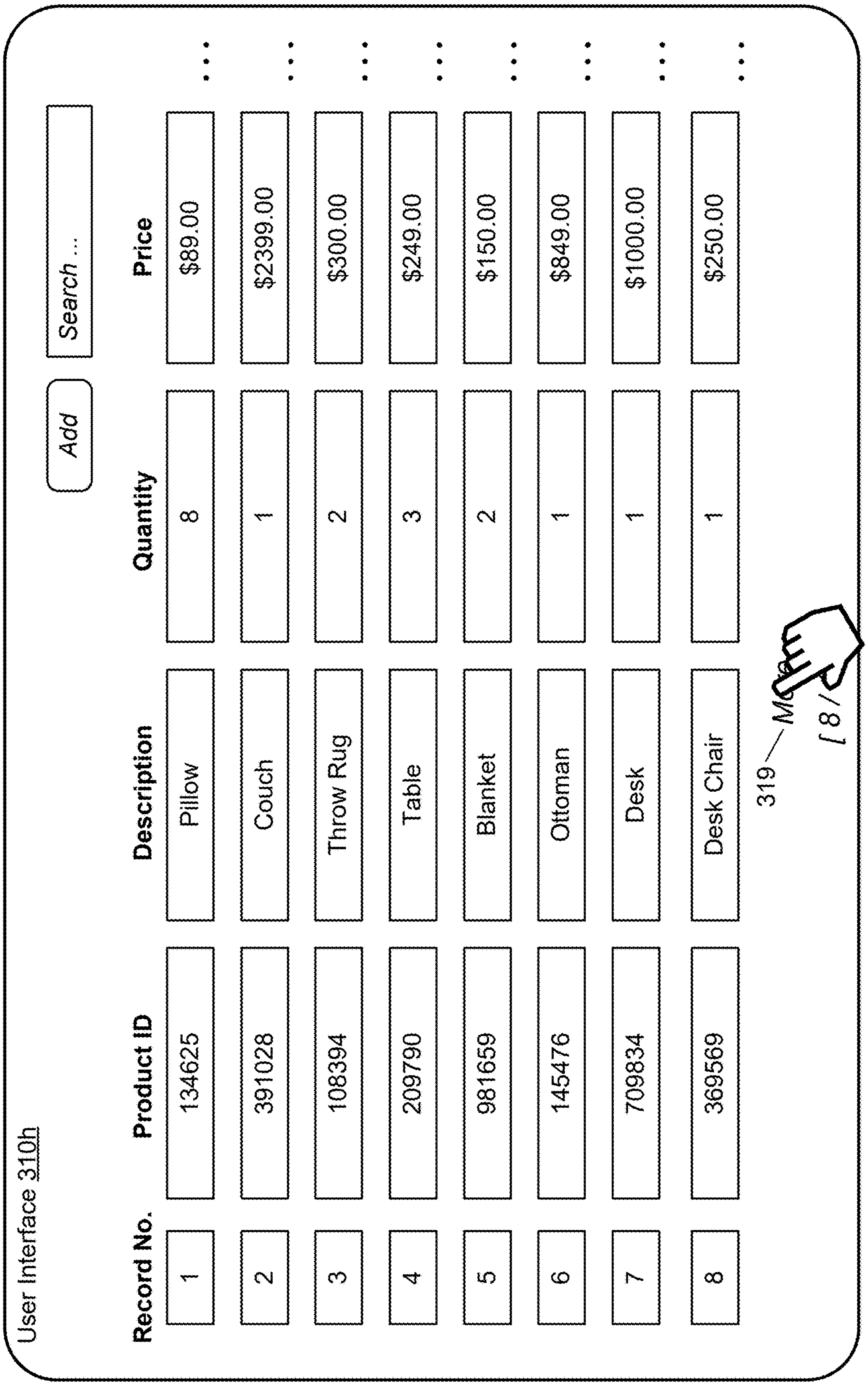
Figure 3I:
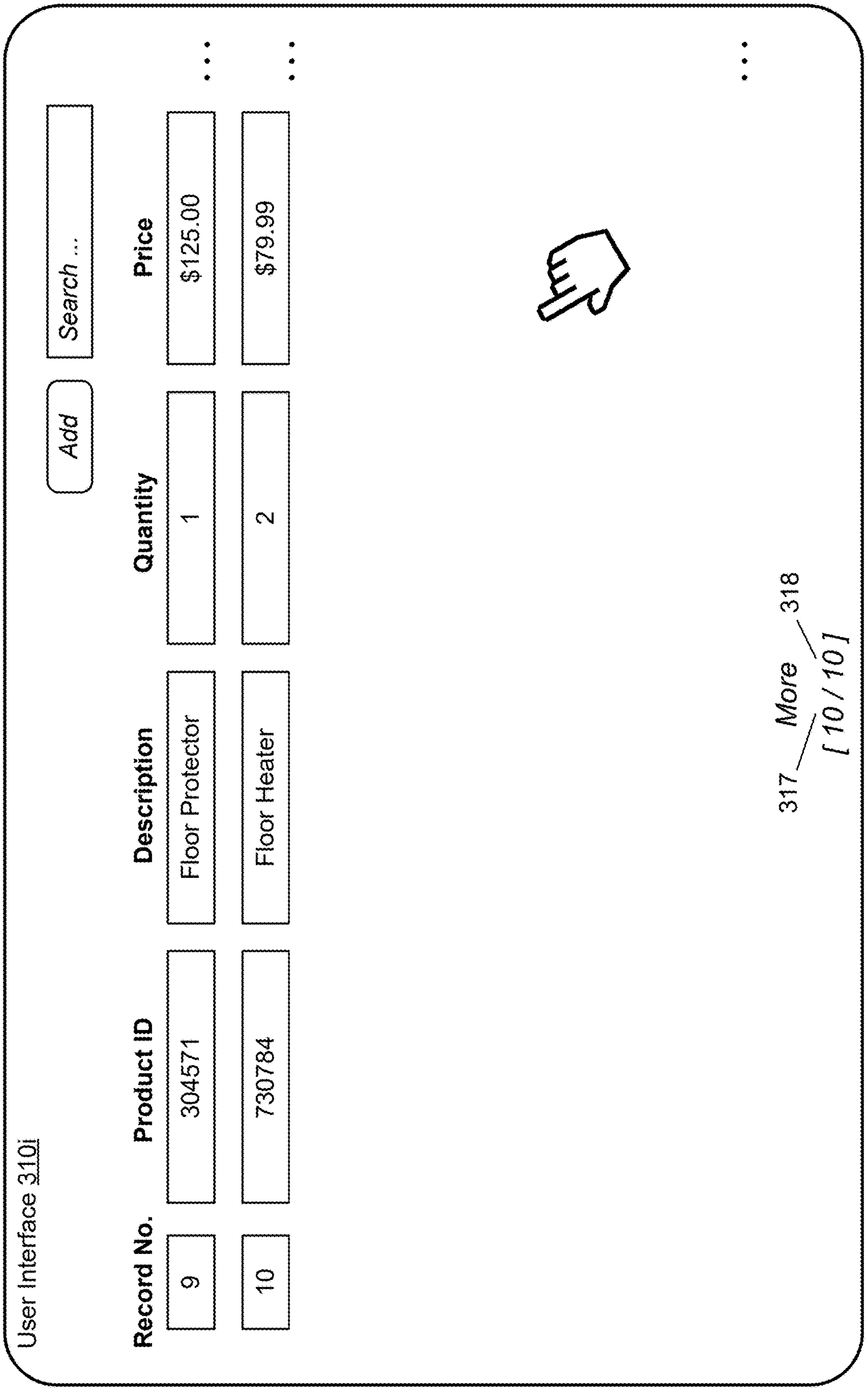

FIG. 3H illustrates a view 300H of a user clicking a more button 319 at the bottom of a user interface 310*h*. In response, the software may populate the user interface with a next page of rows of data that are available. For example, FIG. 3I illustrates a view 300I of a user interface 310*i* in which two additional rows are displayed that do not fit on the previous page. Here, the user can interact with the rows, and even change the content therein through commands that are input using a cursor, touch, keyboard, and/or other device or mechanism. Here, the software may update the identifier 317 to indicate that the last row is shown.

Figure 3J:
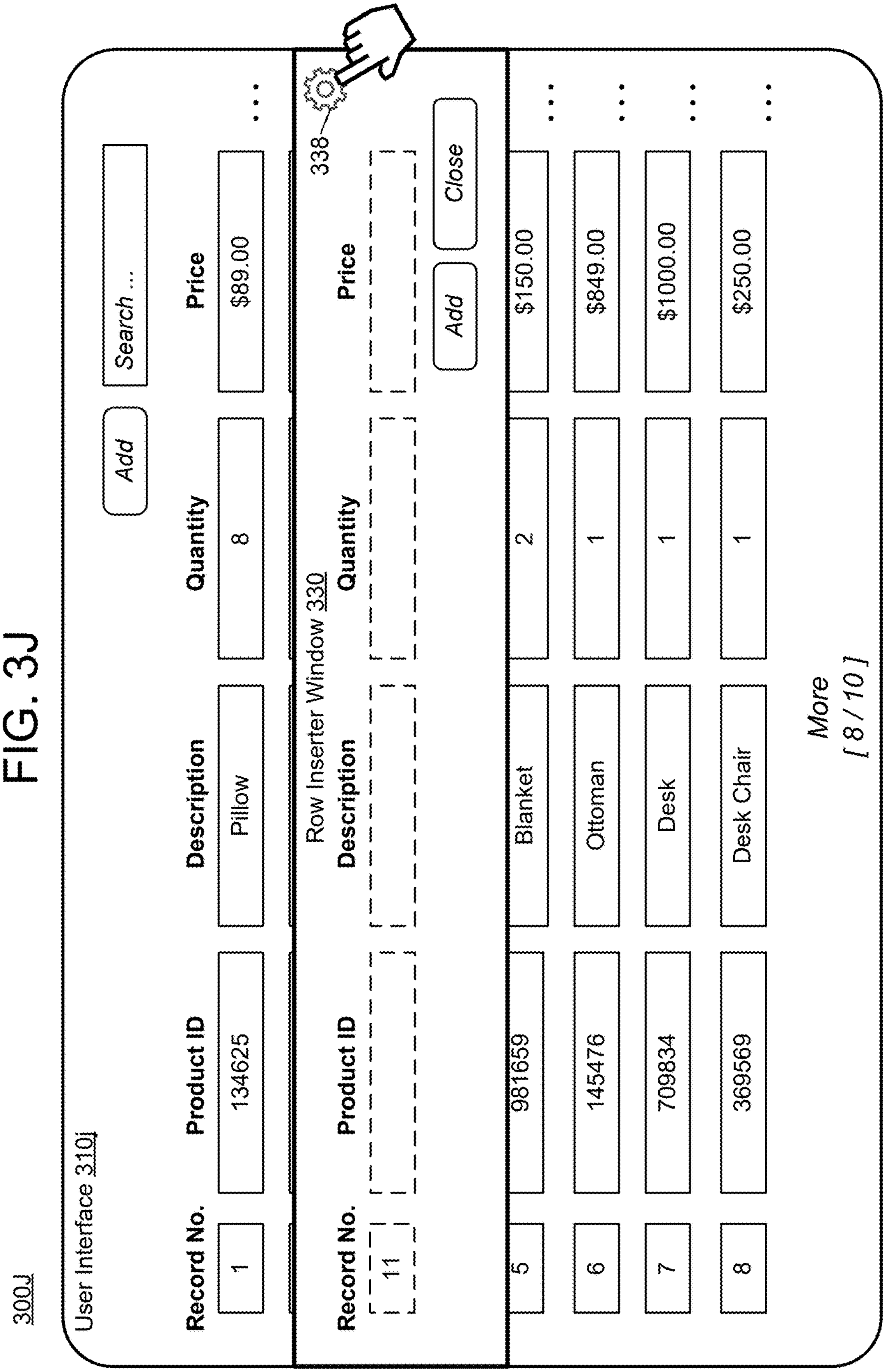

FIG. 3J illustrates a view 300J of a user modifying settings of the row inserter window 330 displayed within a user interface 310*j* by pressing on a settings button 338. In this example, the settings button 338 is enclosed within the row inserter window 330. In this example, the settings button 338 is embedded in the row inserter window 330. However, it should be appreciated that the settings button 338 may be integrated into the user interface 310*j*, however, embodiments are not limited thereto. When the user presses the settings button 338, the software may open a settings menu.

Figure 3K:
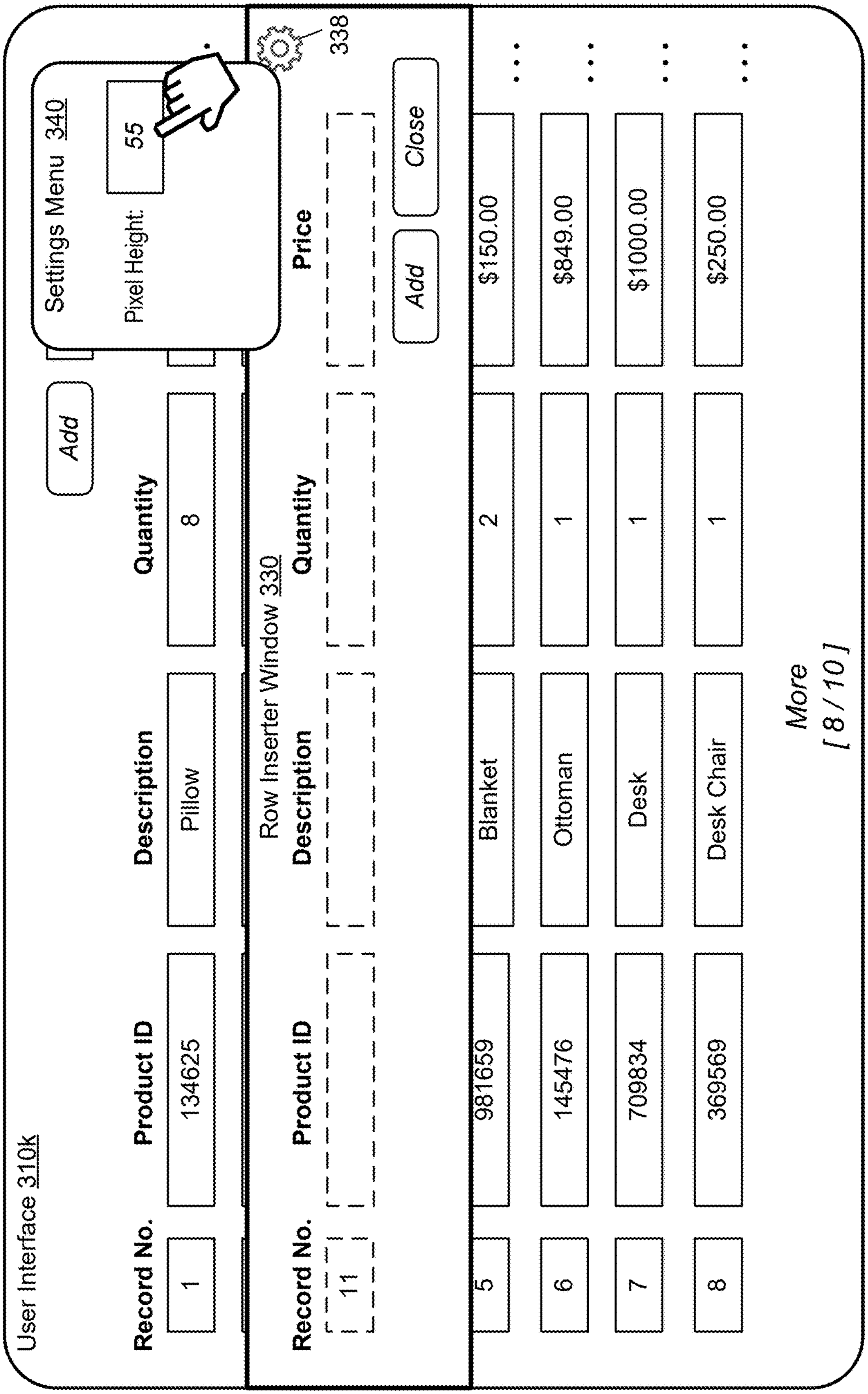

For example, FIG. 3K illustrates a view 300K of a user interface 310*k* after the user has pressed the settings button. In response, the software displays a settings menu 340 over the user interface 310*k* and the row inserter window 330. The user may modify the height at which the row inserter window 330 is displayed by inputting commands into the settings menu 340. When the user activate the row inserter window 330 next time, the row inserter window will initially appear at the modified height set through the settings menu 340.

In the examples of FIGS. 3A-3K, the row inserter window is activated automatically based on user interactions within an underlying user interface over which the row inserter window is displayed. However, its also possible for a user to manually activate the row inserter window, for example, using a button, a link, or another mechanism displayed within the user interface.

Figure 4A:
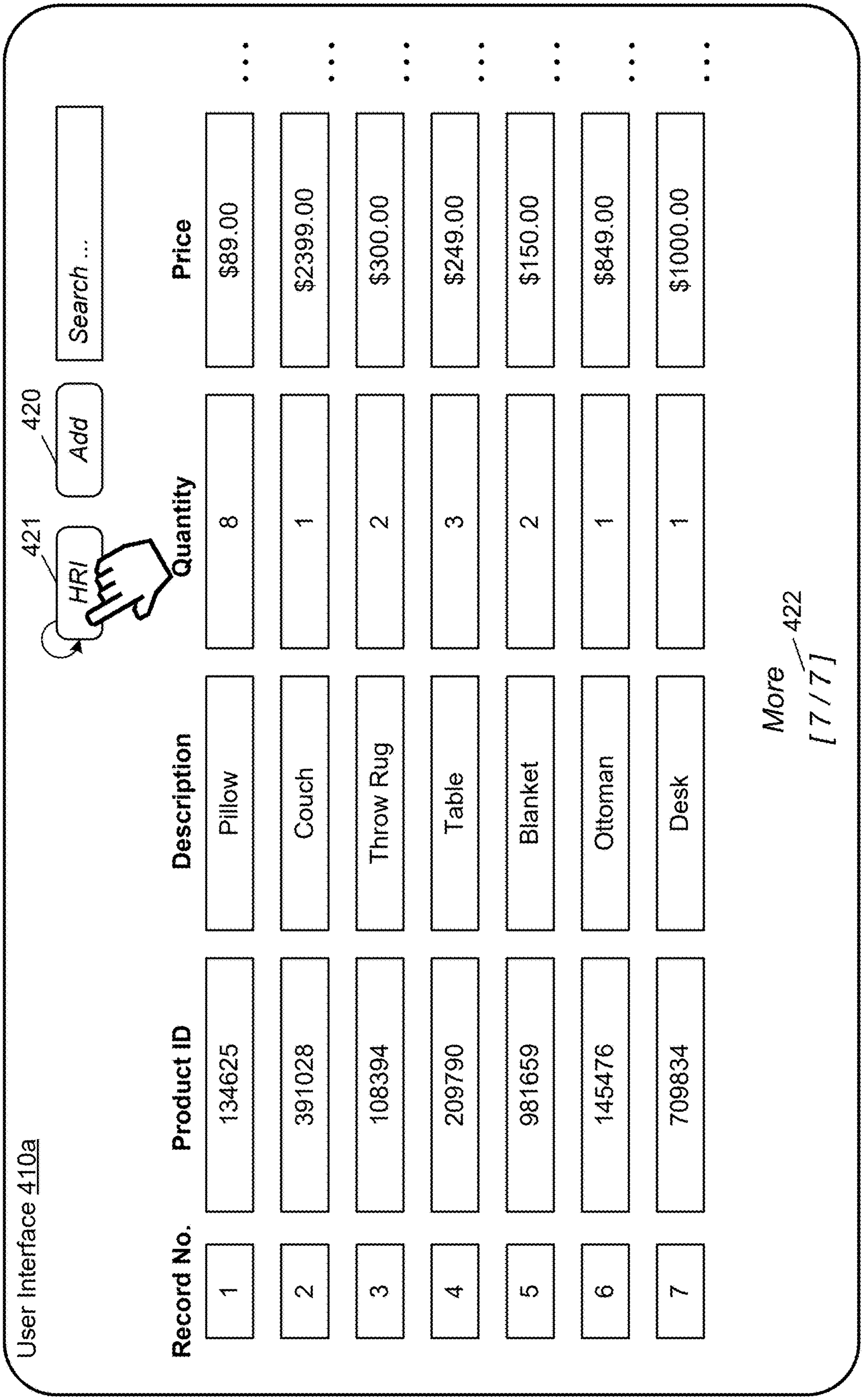
FIGS. 4A-4C are diagrams illustrating a process of inserting data into a table using a hidden row inserter in accordance with other example embodiments.
Figure 4B:
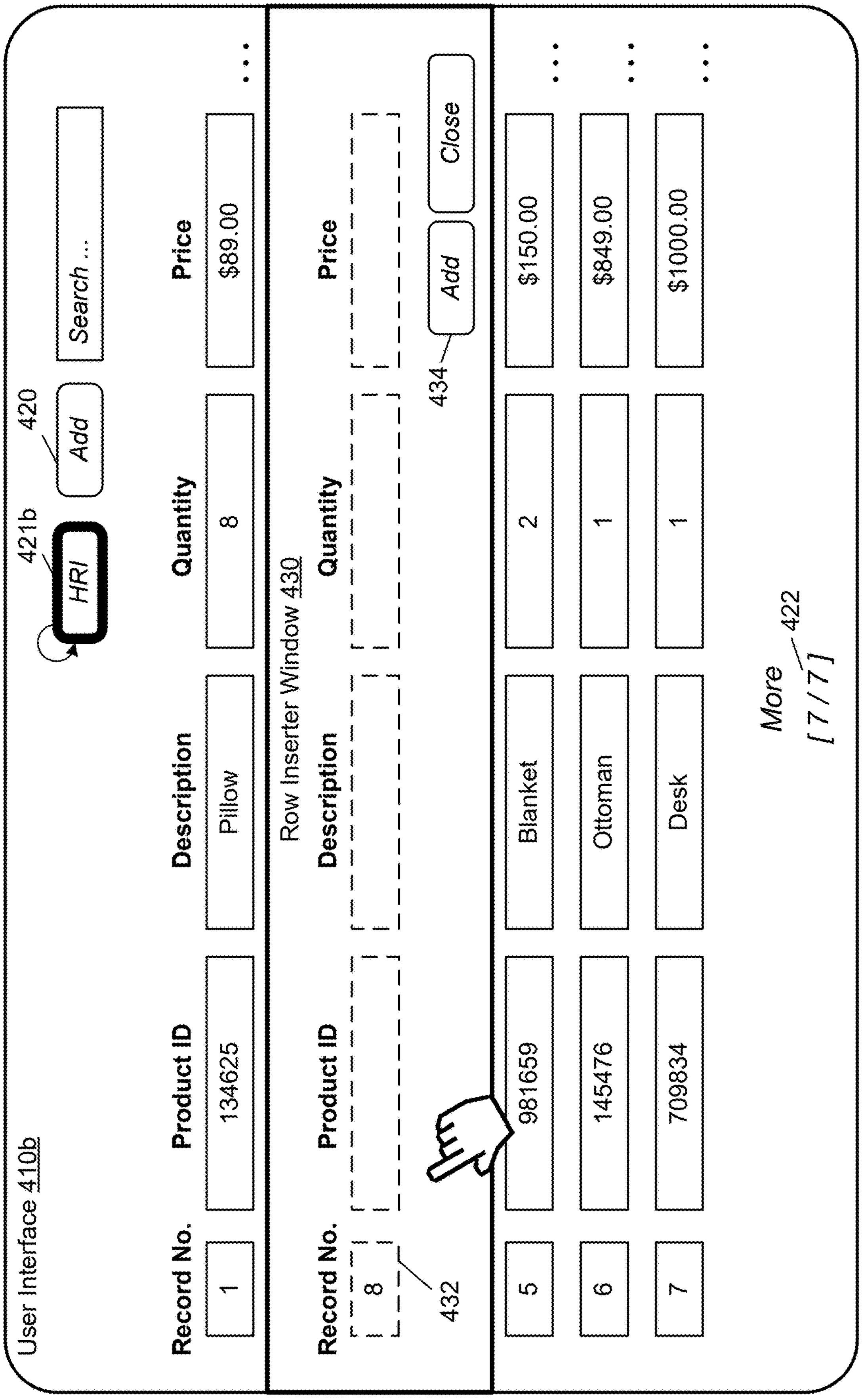
Figure 4C:
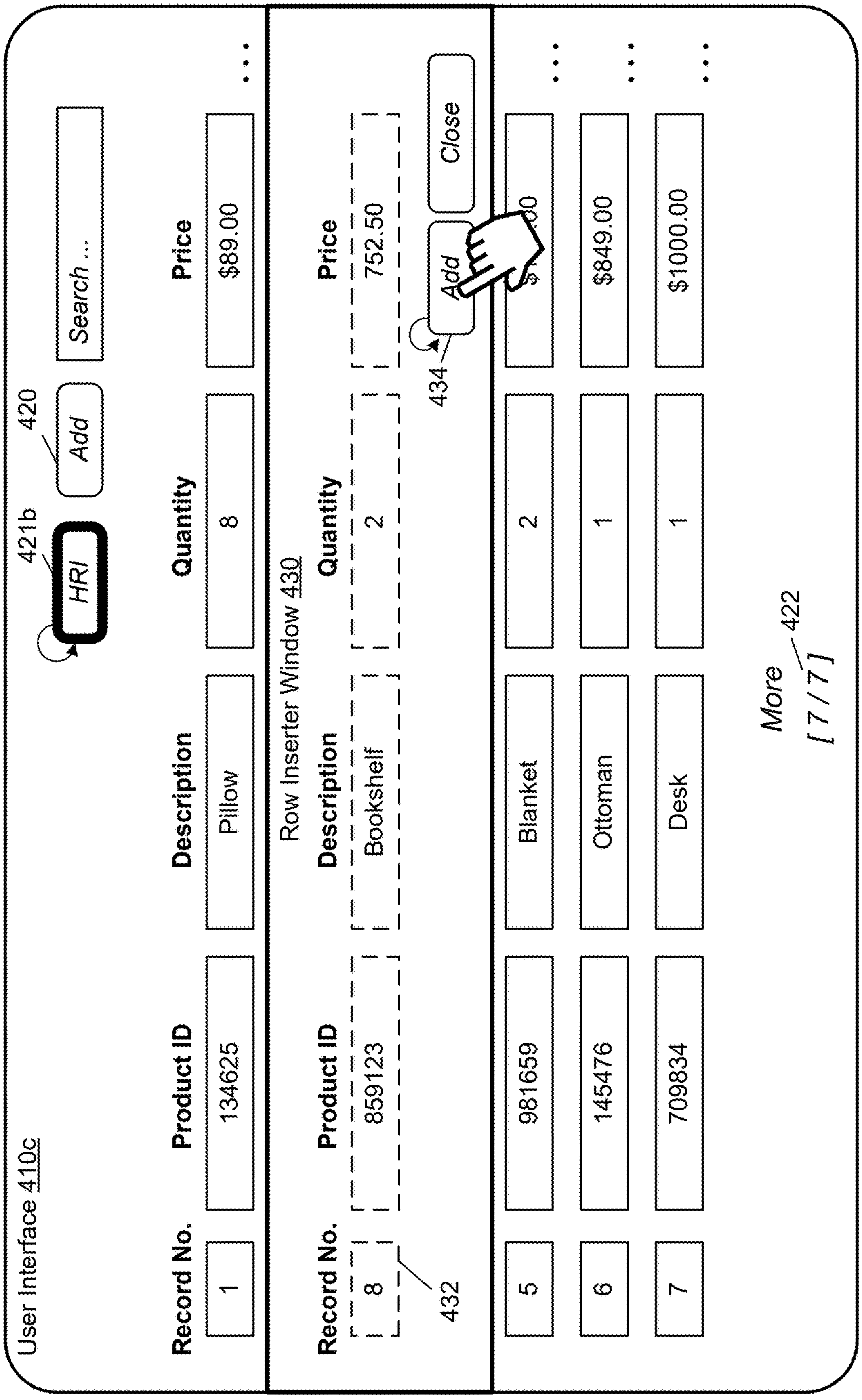

FIGS. 4A-4C illustrate a process of inserting data into a table using a hidden row inserter in accordance with other example embodiments. For example, FIG. 4A illustrates a view 400A of a user interface 410*a* with tabular content displayed therein. In this example, the user can manually activate/open the hidden row inserter by clicking on a control element 421 within the user interface 410*a*. The user interface 410*a* also includes a search button 420 and a total row identifier 422. As an example, the control element 421 may be a button or other graphical element with an icon or the like displayed therein. Here, a user can use a cursor or other input mechanism and click on the control element 421. In response, the software may open a row inserter window over the user interface.

For example, FIG. 4B illustrates a view 400B of a user interface 410*b* after the user has pressed the control element 421. In response, the software opens a row inserter window 430 that is overlayed on the user interface 410*b* and partially overlapping some of the rows displayed in the underlying table within the user interface 410*b*. Here, the row inserter window 430 includes an empty row 432 to be filled in by the user. Furthermore, the software may change an appearance of the control element 421 into a control element 421*b* by changing one or more of the color, shading, style, etc. of the control element. The user may enter data into the empty row 432 thereby filling in the empty fields on the row inserter window 430 with content that can be added to the underlying table.

FIG. 4C illustrates a view 400C of a user interface 410*c* where the user presses an add button 434 included within the row inserter window 430. The software may add the row to the underlying user interface. From here, the user may continue to use the software and the row inserter window as describe with respect to the examples in FIGS. 3A-3K. The row inserter window 430 may be used to store new rows within the underlying user interface. If the software determines that there is no more room within the underlying user interface, the software may insert the new row from the row inserter window 430 into a page that is not currently visible thereby allowing the user to keep their viewing place on the original user interface without a need to view the page that is not currently visible.

Figure 5:
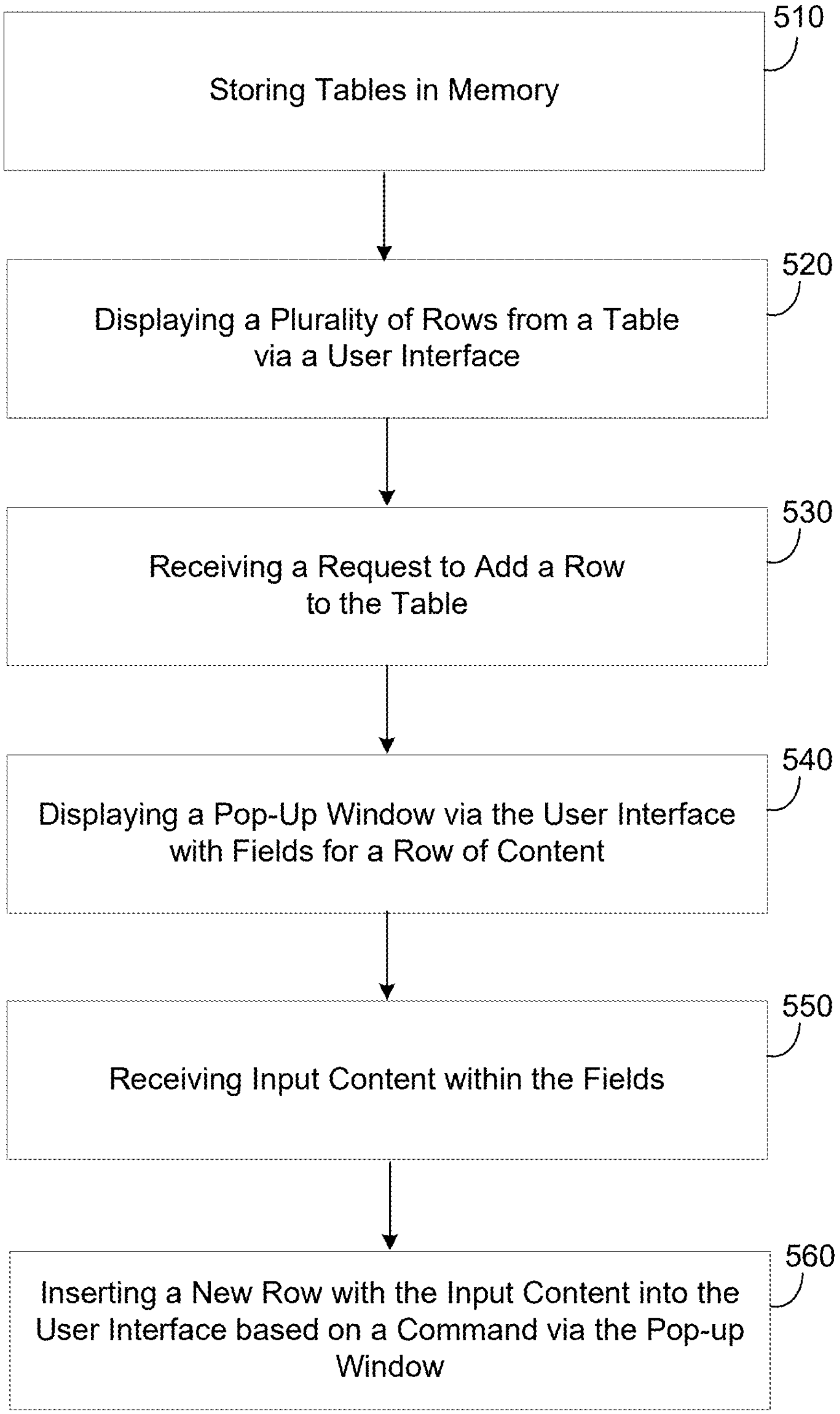
FIG. 5 is a diagram illustrating a method of inserting data into a table with a hidden row inserter in accordance with an example embodiment.

FIG. 5 illustrates a method 500 of adding data to a user interface via a pop-up row insertion window in accordance with an example embodiment. As an example, the method 500 may be performed by a user device, a web server, a cloud platform, an on-premises server, a database node included within a distributed database system, and the like. Referring to FIG. 5, in 510, the method may include storing tables of data in memory. As an example, the tables of data may include database tables with row and columns of data. The tables may be stored in a data storage such as a database, or other storage device.

In 520, the method may include displaying a plurality of rows of data from a table among the tables of data stored within the memory via a user interface of a software application. The space that is available on the user interface may be limited. In 530, the method may further include receiving a request to add a row to the table. The request may be provided from the user interface. In 540, the method may include displaying a pop-up window via the user interface, the pop-up window comprising a plurality of fields for inputting data and an input button. In 550, the method may include receiving input content via the plurality of fields within the pop-up window. In 560, the method may include inserting a new row with the received input content into the plurality of rows of data displayed via the user interface, in response to a command via the user interface.

In some embodiments, the receiving may include receiving a request to add a new row to the table based on an input on the user interface, and the method may further include determining that the user interface is full in response to the input, and displaying the pop-up window via the user interface in response to the determination that the user interface is full. In some embodiments, the inserting comprises may include inserting the new row into a hidden page on the user interface in response to receiving a second command via the pop-up window, and further modifying a page number of total pages displayed on a currently shown page of the user interface.

In some embodiments, the method may further include determining that available space exists in the user interface, and the inserting comprises inserting the new row into a currently shown page of the user interface in response to the determination that the user interface has available space. In some embodiments, the receiving may include detecting a user input on the user interface with respect to a predetermined user interface control, and the displaying may include displaying the pop-up window via the user interface in response to the user input on the user interface.

In some embodiments, the displaying may include displaying the pop-up window at a height of a predetermined row of data from among the plurality of rows of data displayed within the user interface. In some embodiments, the inserting may include inserting the new row with the received input content into the table stored within the memory in response to the command. In some embodiments, the pop-up window may include a solid background, and the displaying may include overlaying the pop-up window on top of one or more rows of data displayed within the user interface. In this example, the solid background of the pop-up window my conceal underlying content within the user interface.

Figure 6:
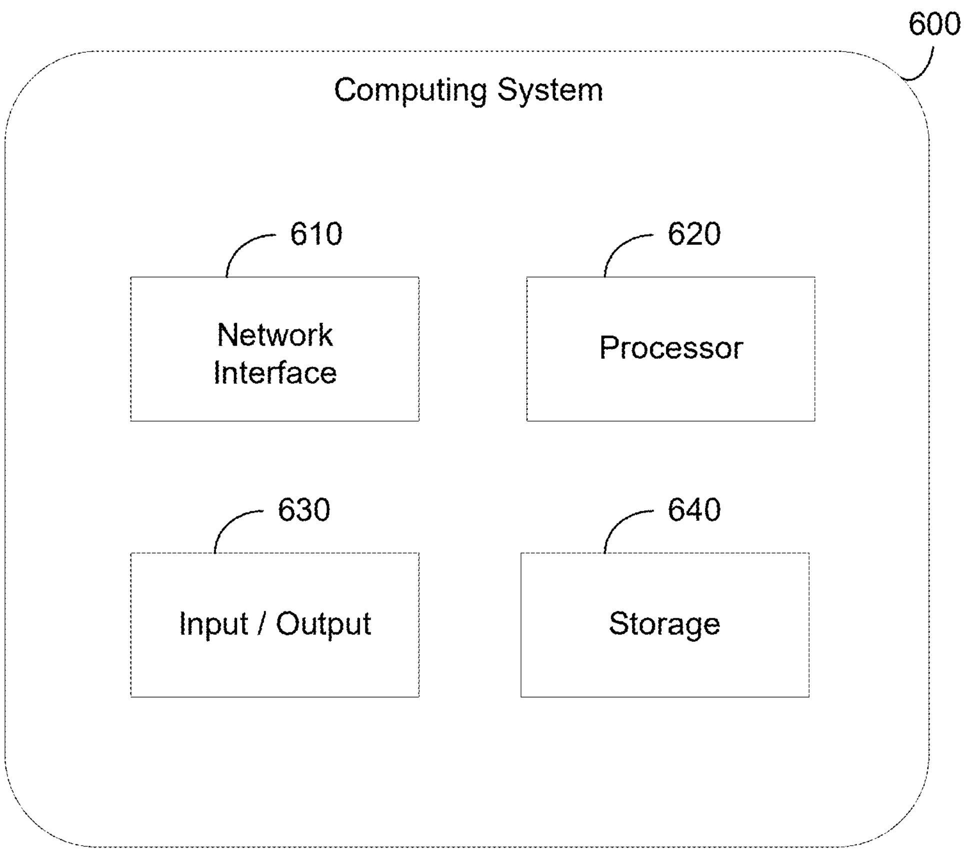
FIG. 6 is a diagram illustrating a computing system for use in the embodiments that are described herein.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. In some embodiments, the storage 640 may include a data store having a plurality of tables, database tables, records, partitions and sub-partitions. The storage 640 may be used to store database records, documents, entries, and the like. As another example, the storage may store an executable of a software application that is configured to implement the fast input window described in the example embodiments.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

a memory configured to store tables of data; and a processor communicably coupled to the memory and configured to:

display a plurality of rows of data from a table among the tables of data stored within the memory via a user interface of a software application, receive a request to add a row to the table based on an input on the user interface, determine whether the user interface is full in response to the input, and, in response to determining that the user interface is full, display a pop-up window via the user interface, the pop-up window comprising a plurality of fields for inputting data and an input button, receive input content via the plurality of fields within the pop-up window, and insert a new row with the received input content into the plurality of rows of data displayed via the user interface, in response to a command via the pop-up window.

2. The computing system of claim 1, wherein the processor is configured to insert the new row into a hidden page on the user interface in response to a second command via the pop-up window, and modify a page number of total pages displayed on a currently shown page of the user interface.

3. The computing system of claim 1, wherein the processor is further configured to determine that available space exists in the user interface, and insert the new row into a currently shown page of the user interface in response to the determination that the user interface has available space.

4. The computing system of claim 1, wherein the processor is further configured to detect a user input on the user interface with respect to a predetermined user interface control, and display the pop-up window via the user interface in response to the user input on the user interface.

5. The computing system of claim 1, wherein the processor is configured to display the pop-up window at a height of a predetermined row of data from among the plurality of rows of data displayed within the user interface.

6. The computing system of claim 1, wherein the processor is further configured to insert the new row with the received input content into the table stored within the memory in response to the command.

7. The computing system of claim 1, wherein the pop-up window comprises a solid background, and the processor is configured to overlay the pop-up window on top of one or more rows of data displayed within the user interface.

8. A method comprising:

storing tables of data in memory;

displaying a plurality of rows of data from a table among the tables of data stored within the memory via a user interface of a software application;

receiving a request to add a row to the table based on an input on the user interface;

determine whether the user interface is full in response to the input, and, in response to determining that the user interface is full:

displaying a pop-up window via the user interface, the pop-up window comprising a plurality of fields for inputting data and an input button;

receiving input content via the plurality of fields within the pop-up window; and inserting a new row with the received input content into the plurality of rows of data displayed via the user interface, in response to a command via the pop-up window.

9. The method of claim 8, wherein the inserting comprises inserting the new row into a hidden page on the user interface in response to receiving a second command via the pop-up window, and modifying a page number of total pages displayed on a currently shown page of the user interface.

10. The method of claim 8, wherein the method further comprises determining that available space exists in the user interface, and the inserting comprises inserting the new row into a currently shown page of the user interface in response to the determination that the user interface has available space.

11. The method of claim 8, wherein the receiving comprises detecting a user input on the user interface with respect to a predetermined user interface control, and displaying the pop-up window via the user interface in response to the user input on the user interface.

12. The method of claim 8, wherein the displaying comprises displaying the pop-up window at a height of a predetermined row of data from among the plurality of rows of data displayed within the user interface.

13. The method of claim 8, wherein the inserting comprises inserting the new row with the received input content into the table stored within the memory in response to the command.

14. The method of claim 8, wherein the pop-up window comprises a solid background, and the displaying comprises overlaying the pop-up window on top of one or more rows of data displayed within the user interface.

15. A computer-readable medium comprising instructions which when executed by a processor cause a computer to perform a method comprising:

storing tables of data in memory;

displaying a plurality of rows of data from a table among the tables of data stored within the memory via a user interface of a software application;

receiving a request to add a row to the table based on an input on the user interface;

determine whether the user interface is full in response to the input, and, in response to determining that the user interface is full:

displaying a pop-up window via the user interface, the pop-up window comprising a plurality of fields for inputting data and an input button;

receiving input content via the plurality of fields within the pop-up window; and inserting a new row with the received input content into the plurality of rows of data displayed via the user interface, in response to a command via the pop-up window.

16. The computer-readable medium of claim 15, wherein the inserting comprises inserting the new row into a hidden page on the user interface in response to receiving a second command via the pop-up window, and modifying a page number of total pages displayed on a currently shown page of the user interface.

17. The computer-readable medium of claim 15, wherein the method further comprises determining that available space exists in the user interface, and the inserting comprises inserting the new row into a currently shown page of the user interface in response to the determination that the user interface has available space.

* * * * *